US011737011B2

(12) United States Patent
Aggarwal et al.

(10) Patent No.: US 11,737,011 B2
(45) Date of Patent: Aug. 22, 2023

(54) MANAGEMENT OF ACCESS TOKENS IN COMMUNICATION NETWORKS

(71) Applicant: Nokia Technologies Oy, Espoo (FI)

(72) Inventors: Chaitanya Aggarwal, Munich (DE); Saurabh Khare, Bangalore (IN); Anja Jerichow, Grafing bei München (DE); Bruno Landais, Pleumeur-Bodou (FR)

(73) Assignee: Nokia Technologies Oy, Espoo (FI)

( * ) Notice: Subject to any disclaimer, the term of this patent is extended or adjusted under 35 U.S.C. 154(b) by 54 days.

(21) Appl. No.: 17/410,626

(22) Filed: Aug. 24, 2021

(65) Prior Publication Data

US 2022/0086734 A1 Mar. 17, 2022

(30) Foreign Application Priority Data

Aug. 25, 2020 (IN) .............................. 202041036619

(51) Int. Cl.
*H04W 48/08* (2009.01)
(52) U.S. Cl.
CPC ................................ *H04W 48/08* (2013.01)
(58) Field of Classification Search
None
See application file for complete search history.

(56) References Cited

U.S. PATENT DOCUMENTS 10,819,636 B1\* 10/2020 Goel .................. H04L 47/10
2020/0404069 A1\* 12/2020 Li ........................ H04W 8/24

OTHER PUBLICATIONS

Extended European Search Report received for corresponding European Patent Application No. 21191868.5, dated Jan. 18, 2022, 7 pages.
"Enhancement on the client credentials assertion verification", 3GPP TSG-SA3 Meeting #100e, S3-201845, Huawei, Aug. 17-24, 2020, 7 pages.
"Re-using access token in indirect communication with delegated discovery", 3GPP TSG-SA3 Meeting #100e, S3-201802, Nokia, Aug. 17-28, 2020, 3 pages.
"Re-using of access token in indirect communication with delegated discovery", 3GPP TSG-SA3 Meeting #101e, S3-202883, Nokia, Nov. 9-20, 2020, 4 pages.
"3rd Generation Partnership Project; Technical Specification Group Services and System Aspects; Security architecture and procedures for 5G system (Release 16)", 3GPP TS 33.501, V16.3.0, Jul. 2020, pp. 1-248.
"Token request parameters in Scenario D", 3GPP TSG-SA3 Meeting #100e, S3-201924, Ericsson, Aug. 17-28, 2020, 3 pages.

(Continued)

*Primary Examiner* — Hong S Cho
(74) *Attorney, Agent, or Firm* — Laine IP Oy

(57) ABSTRACT

According to an example aspect of the present invention, there is provided a method comprising, transmitting to a Network Function, NF, service producer, by a Service Communication Proxy, SCP, a service request on behalf of an NF service consumer, wherein the service request comprises an access token, receiving, by the SCP, a service response from the NF service producer and upon receiving the service response, transmitting to the NF service consumer, by the SCP, information related to the access token.

17 Claims, 6 Drawing Sheets

(56) References Cited

OTHER PUBLICATIONS

"3rd Generation Partnership Project; Technical Specification Group Core Network and Terminals; 5G System; Technical Realization of Service Based Architecture; Stage 3 (Release 16)", 3GPP TS 29.500, V16.4.0, Jun. 2020, pp. 1-79.

"3rd Generation Partnership Project; Technical Specification Group Core Network and Terminals; 5G System; Network Function Repository Services; Stage 3 (Release 16)", 3GPP TS 29.510, V16.4.0, Jul. 2020, pp. 1-192.

* cited by examiner

MANAGEMENT OF ACCESS TOKENS IN COMMUNICATION NETWORKS

FIELD

Various example embodiments relate in general to communication networks, such as core networks of cellular communication systems, and more specifically, to management of access tokens in such networks.

BACKGROUND

Access tokens are used in various communication networks to ensure that only users and network entities that have a right to access certain services can do that. Management of access tokens is important for example in core networks of cellular communication systems, such as in 5G core networks developed by the 3rd Generation Partnership Project, 3GPP. The 3GPP still develops 5G core networks and there is a need to provide enhanced methods, apparatuses and computer programs for management of access tokens. Such enhancements may be useful in other communication networks as well.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided a method comprising transmitting to a Network Function, NF, service producer, by a Service Communication Proxy, SCP, a service request on behalf of an NF service consumer, wherein the service request comprises an access token, receiving, by the SCP, a service response from the NF service producer and upon receiving the service response, transmitting to the NF service consumer, by the SCP, information related to the access token.

Example embodiments of the first aspect may comprise at least one feature or any combination from the following bulleted list:
- said information related to the access token, preferably generated by the SCP, comprises at least one access token request parameter;
- said information related to the at least one access token request parameter comprises a parameter used by the SCP to retrieve the access token;
- said information related to the access token indicates what information the NF service consumer should include to subsequent requests for access authorization, and said information related to the access token is preferably in a header, such as a 3GPP-SBI-AccessTokenRelatedInfo header or an HTTP header;
- the access token is transmitted along with said information related to the access token;
- forwarding by the SCP a header comprising said information related to the access token, such as a 3GPP-SBI-AccessTokenRelatedInfo header or an HTTP header, received from a SCP producer to the NF service consumer, wherein the SCP is a SCP consumer;
- transmitting by the SCP a header comprising said information related to the access token, such as a 3GPP-SBI-AccessTokenRelatedInfo header or an HTTP header, to a SCP producer, wherein the SCP is a SCP consumer.

According to a second aspect of the present invention, there is provided a method comprising transmitting, by a Network Function, NF, service consumer, a service request to a Service Communication Proxy, SCP and responsive to transmitting the service request, receiving from the SCP, by the NF service consumer, information related to an access token.

Example embodiments of the second aspect may comprise at least one feature or any combination from the following bulleted list:
- said information related to the access token comprises at least one access token request parameter;
- said information related to the at least one access token request parameter comprises a parameter used by the SCP to retrieve the access token;
- said information related to the access token indicates what information the NF service consumer should include to subsequent requests for access authorization;
- the access token is received along with said information related to the access token;
- receiving by the NF service consumer a header comprising said information related to the access token, such as a 3GPP-SBI-AccessTokenRelatedInfo header or an HTTP header, received from a SCP producer via the SCP, wherein the SCP is a SCP consumer.

Example embodiments of the first or the second aspect may comprise at least one feature or any combination from the following bulleted list:
- the SCP and the NF service consumer operate according to at least one standard specification defined by a 3rd Generation Partnership Project, 3GPP.
- the at least one standard specification is a 5G standard.

According to a third aspect of the present invention, there is provided an apparatus, comprising one or more processors, and memory storing instructions that, when executed by the one or more processors, cause the apparatus to perform a method according to the first aspect. The at least one memory and the computer program code may be configured to, with the at least one processing core, cause the apparatus at least to perform, transmit to a Network Function, NF, service producer, by a Service Communication Proxy, SCP, a service request on behalf of an NF service consumer, wherein the service request comprises an access token, receive, by the SCP, a service response from the NF service producer and transmit to the NF service consumer, by the SCP, information related to the access token upon receiving the service response. The apparatus of the third aspect may be the SCP, or a device controlling functioning thereof.

According to a fourth aspect of the present invention, there is provided an apparatus, comprising one or more processors, and memory storing instructions that, when executed by the one or more processors, cause the apparatus to perform a method according to the second aspect. The at least one memory and the computer program code may be further configured to, with the at least one processing core, cause the apparatus at least to perform, transmit, by a Network Function, NF, service consumer, a service request to a Service Communication Proxy, SCP and receive from the SCP, by the NF service consumer, information related to an access token responsive to transmitting the service request. The apparatus of the fourth aspect may be the NF service consumer, or a device controlling functioning thereof.

According to a fifth aspect of the present invention, there is provided an apparatus, comprising means for performing a method according to the first aspect. The apparatus may comprise means for transmitting to a Network Function, NF, service producer, by a Service Communication Proxy, SCP, a service request on behalf of an NF service consumer, wherein the service request comprises an access token, means for receiving, by the SCP, a service response from the NF service producer and means for transmitting to the NF service consumer, by the SCP, information related to the access token upon receiving the service response. The apparatus of the fifth aspect may be the SCP, or a device controlling functioning thereof.

According to a sixth aspect of the present invention, there is provided an apparatus, comprising means for performing a method according to the second aspect. The apparatus may comprise means for transmitting, by a Network Function, NF, service consumer, a service request to a Service Communication Proxy, SCP and means for receiving from the SCP, by the NF service consumer, information related to an access token responsive to transmitting the service request. The apparatus of the sixth aspect may be the NF service consumer, or a device controlling functioning thereof.

According to a seventh aspect of the present invention, there is provided non-transitory computer readable medium having stored thereon a set of computer readable instructions that, when executed by at least one processor, cause an apparatus to at least perform the method of the first aspect. According to an eighth aspect of the present invention, there is provided non-transitory computer readable medium having stored thereon a set of computer readable instructions that, when executed by at least one processor, cause an apparatus to at least perform the method of the second aspect.

According to a ninth aspect of the present invention, there is provided a computer program configured to perform the method of the first aspect. According to a tenth aspect of the present invention, there is provided a computer program configured to perform the method of the second aspect.

EXAMPLE EMBODIMENTS

Management of access tokens may be improved by the procedures described herein. A Service Communication Proxy, SCP, may incorporate information related to an access token to a service response and transmit the service response to a Network Function, NF, service consumer which transmitted a service request originally. The NF service consumer may thus use said information related to the access token for subsequent requests. Hence, processing of subsequent requests becomes more efficient, because the SCP can skip the discovery process.

Figure 1:
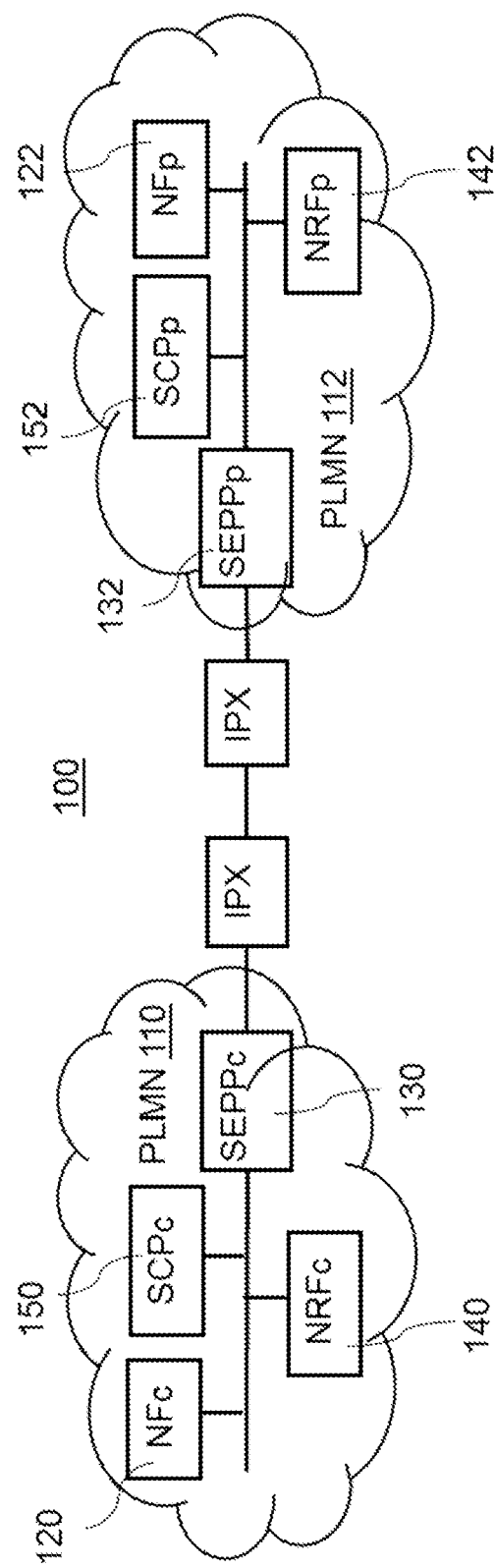
FIG. 1 illustrates an exemplary system in accordance with at least some example embodiments.

FIG. 1 illustrates an exemplary system in accordance with at least some example embodiments of the present invention. The exemplary system of FIG. 1 comprises two Public Land Mobile Networks, PLMNs, 110 and 112, each equipped with at least one NF, 120 and 122, respectively. An NF may refer to an operational and/or a physical entity. An NF may be a specific network node or element, or a specific function or set of functions carried out by one or more entities, such as Virtual Network Elements, VNFs. At least some embodiments of the present invention may be applied in containerized deployments as well. One physical node may be configured to perform plural NFs. Examples of such network functions include a (radio) access or resource control or management function, session management or control function, interworking, data management or storage function, authentication function or a combination of one or more of these functions. It should be noted that even though FIG. 1 shows two PLMNs, embodiments of the present invention are not limited to such a scenario and NFs/SCP/NRFs may be in same PLMN in some embodiments.

In case of a $3^{rd}$ Generation Partnership Project, 3GPP, Service-Based Architecture, SBA, of 5G core networks, NFs may comprise at least some of an Access and Mobility Function, AMF, a Session Management Function, SMF, a Network Slice Selection Function, NSSF, a NEF, an Network Repository Function, NRF, a UDM, an Authentication Server Function, AUSF, a Policy Control Function, PCF, an Application Function, AF, Operations Administration and Maintenance, OAM, and Network Data Analysis Function, NWDAF. In some example embodiments, the AF may not be a NF though as defined by the 3GPP. Instead, the AF may be a complement to the NF. The AF may be a third party AF, e.g., for an enterprise.

The PLMNs 110 and 112 may further comprise a Security Edge Protection Proxy, SEPP, 130 and 132, respectively. The SEPPs 130 and 132 may be configured to operate as a security edge node or gateway. The NFs may communicate with each other using representational state transfer Application Programming Interfaces, APIs. These may be known as Restful APIs.

An inter-PLMN interconnection allows secure communication between a service-consuming NF and a service-producing NF, referred to as a NFc 120 and a NFp 122 in FIG. 1. In some example embodiments of the present invention, the NFc 120 may be referred to as an NF service consumer, NFc, and the NFp 122 may be referred to as an NF service producer, NFp. A Service Communication Proxy, SCP, 150 and 152 may be deployed for indirect communication between network functions. The SCP 150 and 152 may be an intermediate function/element for assisting in routing of messages, such as control plane messages such as Diameter Routing Agent, DRA, messages between NFs.

Direct communication may be applied between the NFc 120 and the NFp 122 for an NF service, or NF service communication may be performed indirectly via SCP(s) 150. In direct communication, the NFc 120 may perform discovery of the target NFp 122 by local configuration or via a local NRF, the NRFc 140. The NFc 120 may delegate the discovery of the target NFp 122 to the SCPp 152 used for indirect communication. In the latter case, the SCPp 152 uses the parameters provided by the NFc 120 to perform discovery and/or selection of the target NFp. The SCPp 152 address may be locally configured or retrieved from NRF in SCPc 150 and SCPc 150 address may be locally configured in NFc 120. In general, an SCP may be an intermediate function covering delegated NF discovery to help resolving the target NF producer instances and delegated routing to help route control plane messages between two NFs.

NF discovery and NF service discovery enable core network entities, such as the NFc 140 or the SCPc 150, to discover a set of NF instance(s) and NF service instance(s) for a specific NF service or an NF type. The NRF is a function that is used to support the functionality of NFs and NF service discovery and status notification. The NRF may maintain an NF profile of available NF instances and their supported services. The NRF may notify about newly registered, updated, or deregistered NF instances along with its NF services to a subscribed NFc 120 or SCPc 150. Unless the expected NF and/or NF service information is locally configured on the requester NF, such as when the expected NF service or NF is in the same PLMN as the requester NF, the NF and NF service discovery may be implemented via the NRF. The NRF may be a logical function. The NRF may also support status notification. An NRF may be co-located together with an SCP.

In order for the NFc 120 or the SCPc 150 to obtain information about the NF and/or NF service(s) registered or configured in a PLMN/slice, the NFc 120 or the SCPc 150 may initiate, based on local configuration, a discovery procedure with the NRFc 140. The discovery procedure may be initiated by providing the type of the NF and optionally a list of the specific service(s) it is attempting to discover. The NFc 120 or the SCPc 150 may also provide other service parameters, such as slicing related information.

In case of indirect communication, during an NF service discovery in inter-PLMN (roaming) communication, the SCPc 150, on behalf of the NFc 120, may request service discovery from an NRF in its PLMN 110, i.e., the NRFc 140. The NRFc 140 may send a discovery request to an NRF, referred herein as the NRFp 142, in another PLMN 112, e.g. the home PLMN. The NRFp 142 in the other PLMN 112 may respond with a discovery response which may be forwarded to the SCPc via the NRFc 140 in the PLMN 110 of the NFc 120. Then the SCPc may trigger service requests for the NFp via the SEPPc 130 and the SEPPp 132. When using indirect communication, a NFc 120 may provide the SCP an address or name of the NRF which may be used by the SCP.

It is to be noted that at least some of the entities or nodes 120, 122, 130, 132, 140, 142, 150, 152 may act in both service-consuming and service-providing roles and that their structure may also be similar or identical, even though their role in the example of FIG. 1 in delivery of a particular message is identified by "c" or "p" indicating whether they are acting for the service-consuming or service-producing NF. It is to be noted that instead of "c" and "p", "v" for visited and "h" for home may be used to refer to at least some respective entities in the visited and home PLMNs.

Figure 2:
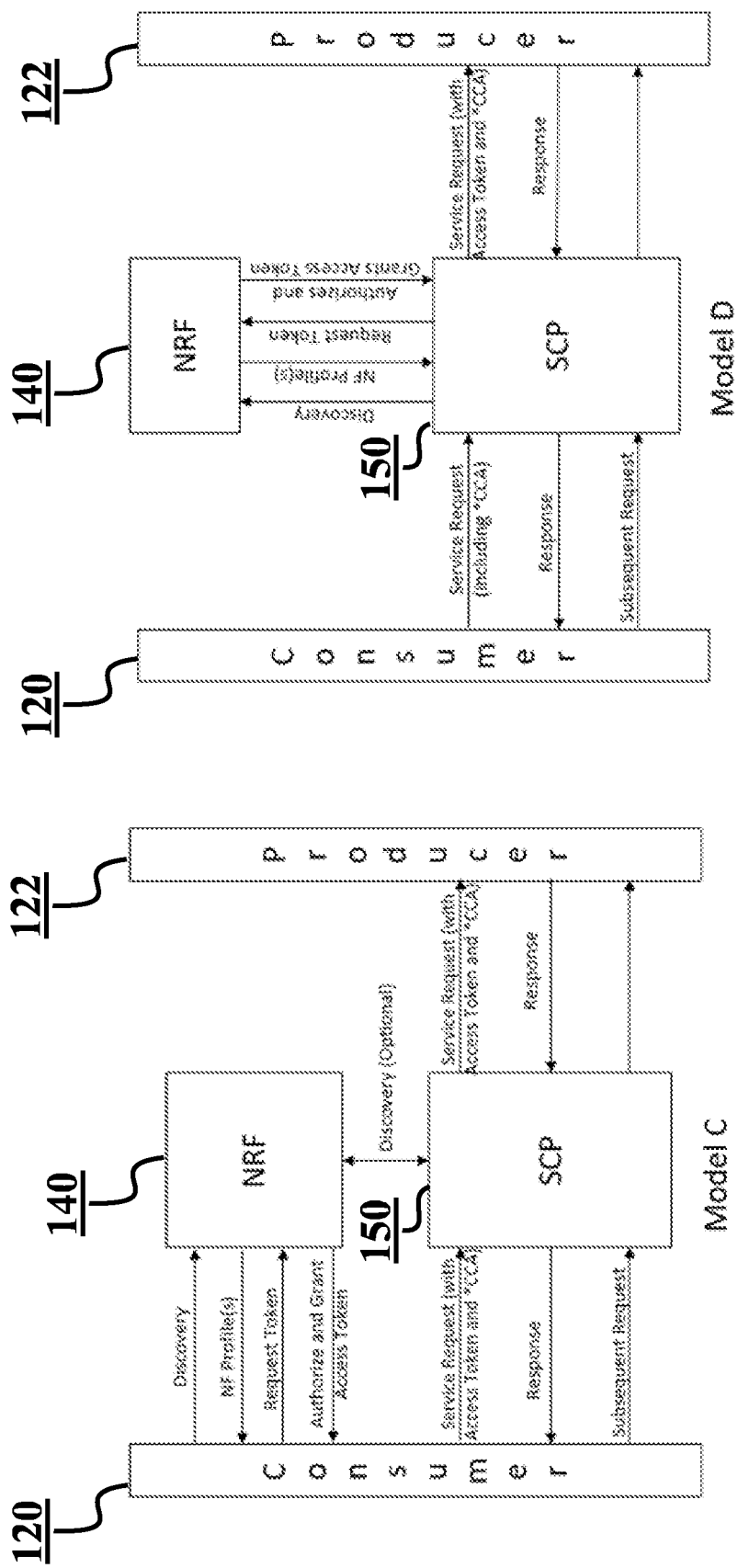
FIG. 2 illustrates a service request and a response in accordance with at least some example embodiments.

FIG. 2 illustrates a service request and a response in accordance with at least some example embodiments. In the 3GPP SBA indirect communication was introduced in Rel-16 with the advent of the SCP, such as SCP 150 and SCP 152 as defined in TS 33.501 V-16.3 clause 13. Specifically, this then leads to two different deployment models for the operators, shown in FIG. 2, Model C—without delegated discovery as specified in clause 13.4.1.3.1 of TS 33.501 V-16.3 and Model D—with delegated discovery as specified in clause 13.4.1.3.2 of TS 33.501 V-16.3.

Therefore, the service request from NFc 120 for a particular NFp 122 always goes via SCP 150, and similarly, the response sent by NFp 122 is first received by SCP 150 which is then forwarded to NFc. SCP 150 in Model D is also responsible for requesting and receiving the authorization token, e.g., from NRFp 142 on behalf on NFc 120, sending a service request to NFp 122 on behalf of NFc 120, and also receiving the response from NFp 122, which is then forwarded to NFc 120.

As specified in the clause 13.1 of TS 33.501 V-16.3, the current security mechanisms include establishing hop-by-hop TLS for securing messages at the transport layer. If the PLMN 110, 112 does not use protection at the transport layer, NDS/IP or physical security may be used. In the clause 13.8 of TS 33.501, a mechanism to support end to end authentication is proposed using the Client Credentials Assertion, CCA. CCA is a token signed by NFc 120. The token enables NFc 120 to authenticate towards the receiving endpoint, such as NRFp 142 or NFp 122 by including the signed token in a service request.

If NFc 120 would add access token parameters to subsequent service requests on its own, such a solution would not be complete because how NFc 122 can know what access token parameters to be included towards SCP 150. In Model D shown in FIG. 2, token and discovery management is a job of SCP 150, therefore, NFc 122 suggesting access token request might not be correct, it may lead to message failure.

As an example, if an AMF wants to send a registration request (service request) to an UDM with discovery parameter (TargetNFType=UDM, NSSAI=eMBB, SUPI=1234556789012345), SCPc 150 would forward the service request to SCPp 152. The SCPp 152 may use discovery parameters to discover the UDM and SCPp 152 may decide to contact the best, selected UDM (UDM instance Id or Set id received in the discovery request) for service request.

Accordingly, SCPp 152 may ask the access token. Based on operator policy, an access token may be at Set level or Instance level or NFtype level. Additionally, the target service producer, such as NFp 122, may support and require the use of a service level access token (i.e. access token authorizing the access to any service operation of the API) or resource/operation specific access token (i.e. access token specific to access a specific service operation of an API).

See clause 6.7.3 of TS 29.500: The access scope required to get access to a given resource may be, based on local configuration of the NF service producer, either:
- the service name of the NF Service; this scope grants generic access to a given API, for those operations on resources that don't require a specific authorization, or
- both, the service name of the NF Service, and a string that uniquely represents the type of operation (e.g. create/modify/read), the resource and the service; those two scopes, together, grant access to those operations on resources that require a specific authorization.

Each NFp 122 may register the allowed service operations per the NF type or NF instance of NFc 120, as an array of scopes. See clause 6.2.6.2.4 of TS 29.510: Definition of type NFService. Since NFc 120 in Model D does not interact with an NRF like NRF 140, i.e., SCP 150, 152 does the NF discovery towards the NRF, but NFc 120 cannot know which access token scope to request.

If a service request is successful, the SCPp 152 passes the access token to SCPc 150 and SCPc 150 passes this token to NFc 120. NFc 120, such as the AMF, may then want to send a subsequent request, such as a registration update, to SCP 150, may reuse the previous received access token. However, if the access token has expired (in general, token may expire in 5-10 min) NFc 120 may add a parameters to the subsequent request so that the SCPp 150 can get the access token accordingly. But if the parameter is decided by NFc 120, the challenge is how NFc 120, such as an AMF, can send those parameters which are relevant for NFp 122, such as an UDM, considering NFc 120 has no idea how SCPp 152 has retrieved the access token in the previous/first service request.

It is first noted that a binding header defined by the 3GPP may be used in some cases only if NFc 120 supports the use of the binding header and token is at Set/Instance level. But if NFc 120 does not support binding, or token is at NFType/Group level, then the binding concept would not be useful at all.

Secondly, NRF 140 may have SUPI to Group Id mapping, therefore, in the discovery response, NRF 140 may have selected the Group for an UDM, and the same group is used for access token request. In this case also, an AMF does not have group details of the UDM for sending access token parameter to SCP 150.

Embodiments of the present invention therefore enable SCP 150 to build for example a new header with access token request parameters, or more generally access token related information, and to pass said information related to the access token in the new header within the service response to NFc 120. NFc 120 may store the received information and pass the information, such as the parameters, to SCP 150 in a subsequent request or include the necessary information (e.g. discovery headers) in subsequent requests according to the access token related information received in the earlier service response. Furthermore, communication between SCPp 152 and SCPc 150 may be enhanced to allow sending back the new header to SCPc 150 and then to NFc 120.

The new header is particularly useful, because SCPs cannot read message content sent by an NFc, therefore the NFc should send the access token related information in a header, such as some HTTP header, example HTTP custom header "3GPP-SBI-AccessTokenRelatedInfo header". The existing defined HTTP headers cannot be used as is, therefore either a new HTTP header may be introduced or some existing available headers modified, to enable efficient management of access tokens.

Figure 3:
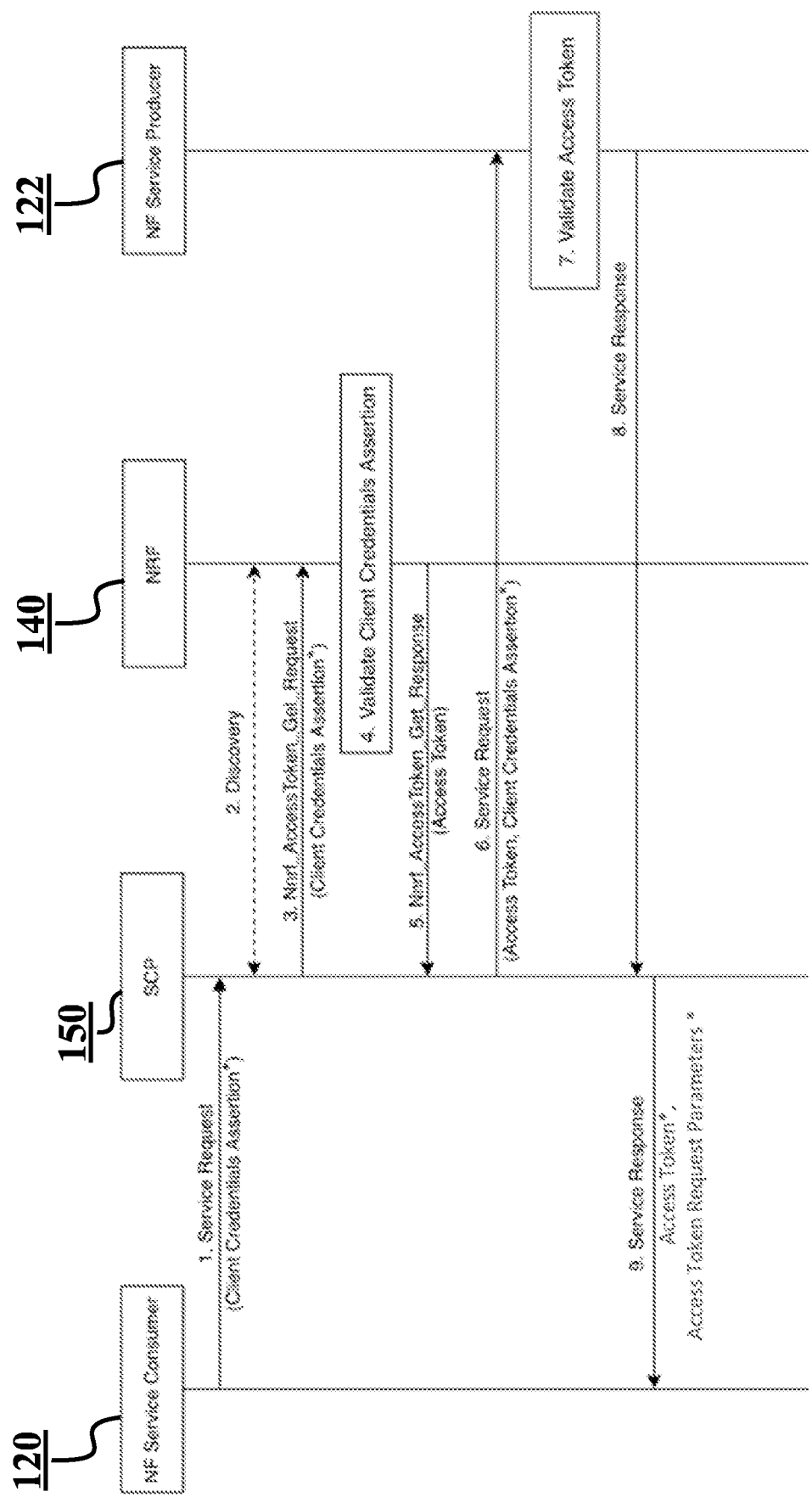
FIG. 3 illustrates a signalling example in accordance with at least some example embodiments.

FIG. 3 illustrates a first signalling example in accordance with at least some example embodiments. On the vertical axes are disposed, from the left to the right, NFc 120, SCP 150, NRF 140 and NFp 122 of FIG. 1, however solution and problem statement are valid if NFs/SCP/NRFs are in same PLMN or different PLMNs. Time advances from the top towards the bottom. FIG. 3 illustrates an example for authorization and service invocation procedure, e.g., for indirect communication with delegated discovery.

At step 1, NFc 120 may send a service request to SCP 150. The service request may include CCA of NFc 120 as defined in clause 13.3.8 of TS 33.501 V-16.3. In the service request, NFc 120 may include discovery parameters.

At step 2, SCP 150 may perform a service discovery with NRF 140. At step 3, SCP 150 may send an access token request (Nnrf_AccessToken_Get Request) to NRF 140. The access token request may comprise parameters as defined for example in clause 13.4.1.1 of TS 33.501. The access token request may include the CCA of NFc 120 if received at Step 1.

At step 4, NRF 140 may authenticate NFc 120 using one of the methods described in clause 13.3.1.2 of TS 33.501. If authentication of NFc 120 is successful and NFc 120 is authorized based on policy of NRF 140, NRF 140 may issue an access token as described in clause 13.4.1.1 of TS 33.501. NRF 140 may use an instance ID of NFc 120 as the subject of the access token.

At step 5, NRF 140 may send the access token to SCP 150 in an access token response (Nnrf_AccessToken_Get Response). At step 6, SCP 150 may send the service request to NFp 122. The service request may include the access token received at Step 5, and also the CCA of NFc 120 if received at Step 1.

At step 7, NFp 122 may authenticate NFc 120 by one of the methods described in clause 13.3.2.2 of TS 33.501 and if successful, NFp 122 validates the access token as described in clause 13.4.1.1 of TS 33.501. At step 8, if the validation of the access token is successful, NFp 122 sends the service response to SCP 150.

At step 9, SCP 150 may include into the service response information related to the access token, such as the access token request parameters used by SCP 150 for sending the service request to NRF 140, and forward the service response to NFc 120. So if NFc 120 includes said information related to the access token to subsequent requests, SCP 150 can process subsequent requests more efficiently, since the SCP can skip the discovery process.

In some embodiments, at step 9, SCP 150 may add a new header, such as 3GPP-SBI-AccessTokenRelatedInfo, which comprises said information related to the access token, like the parameter used by SCP 150 to retrieve the access token and/or access token related information telling the NF service consumer which information it should pass in subsequent requests for access authorization, i.e., what information NFc 120 should include to subsequent requests for access authorization.

Example 1: 3GPP-SBI-AccessTokenRelatedInfo: targetNfType=UDM; targetPlmn=12443; nfInstanceId=Source Instance Id; TargetGroupId=12; TargetSetId/instanceid=123; scope=nudm-sdm. Example 2: 3GPP-SBI-AccessTokenRelatedInfo: targetNfType; targetPlmn; requesterNfInstanceId; scope=nudm-sdm; targetSnssai=eMBB; NOTE: In this second example, the parameters whose value is already known to NFc 120 need not be included in this header (e.g. target NF type=UDM).

Alternatively, in some embodiments, SCP 150 may, at step 150, may return said information related to the access token, such as 3GPP-SBI-AccessTokenRelatedInfo, along with the access token itself to NFc 120. NFc 120 may then store both, said information related to the access token and the access token. As token expiry may be limited to some minutes (for example 5-10 min), the stored access token may become invalid after that time. If NFc 120 wants to initiate a subsequent request and the access token is valid (not expired), then same access token is to be used by NFc 120. However, if the access token has expired (not valid anymore), then NFc 120 must transmit said information related to the access token, such as the 3GPP-SBI-AccessTokenRelatedInfo header, back to SCP 150 for subsequent requests, or instead must include the requested information using a discovery header, such as the 3gpp-Sbi-Discovery header (e.g. 3gpp-Sbi-Discovery-target-nf-type: UDM), see clause 5.2.3.2.7 of TS 29.500. Based on this header, SCP 150 can make a quick decision to get the access token again. Hence the management of access tokens may be improved if the access token is transmitted along with said information related to the access token.

Alternatively, for example in case of multiple SCP deployment, if SCPp 150 is doing an access token retrieval, then, SCPp 152 may send said information related to the access token, such as 3GPP-SBI-AccessTokenRelatedInfo header, back to SCPc 150 and SCPc 150 may send said information to NFc 120. Similarly, if NFc 120 sends a subsequent request to SCPc 150 with said information related to the access token, such as 3GPP-SBI-AccessTokenRelatedInfo header, SCPc 150 may forward the access token to SCPp 152 so that SCPp 152 can retrieve the access token accordingly.

Embodiments of the present invention therefore provide an optimization for SCP 150, since SCP 150 does not need to do a new discovery request towards NRF 140 to discover what access authorization parameters are required by NFp 122 (e.g. required scopes). Instead, SCP 150 can straight away ask for the new access token, i.e. if SCP 150 gets provided with the access token request parameters, SCP 150 can directly contact NRF 140 with this earlier provided information, so discovery request is not needed, SCP 150 is going directly for the token request. Thus, NRF 140 only needs to provide the new access token.

Embodiments of the present invention also allow supporting extensions to the access authorization procedures without impacting NFc 120. E.g. an access token cannot be requested today for a granularity of an NF group, but such extension could be done transparently for NFc 120, by SCP 150 inserting in the 3GPP-SBI-AccessTokenRelatedInfo header the required information (e.g. nfGroupId=xyz).

Figure 4:
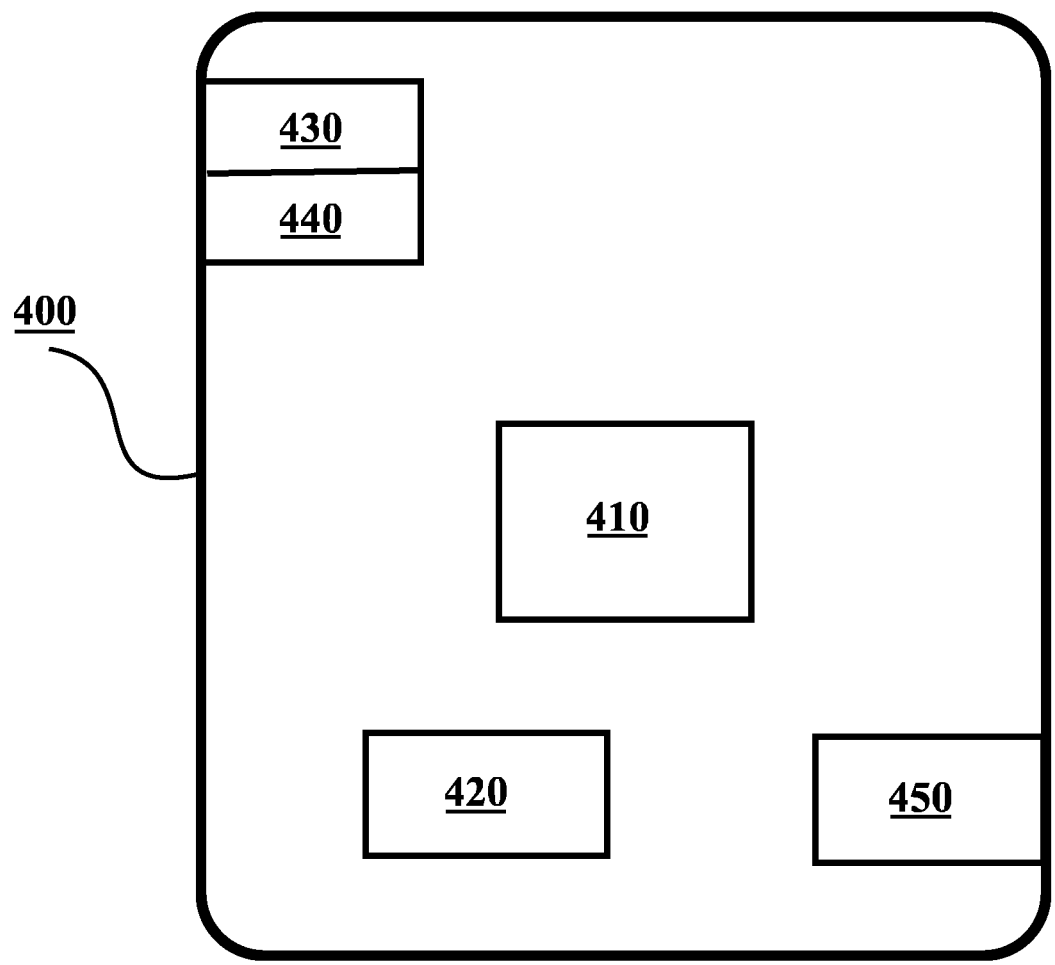
FIG. 4 illustrates an example apparatus capable of supporting at least some example embodiments.

FIG. 4 illustrates an example apparatus capable of supporting at least some example embodiments. Illustrated is device 400, which may comprise, for example, SCP 150 or NFp 120, or a device controlling functioning thereof. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. Processor 410 may comprise at least one Application-Specific Integrated Circuit, ASIC. Processor 410 may comprise at least one Field-Programmable Gate Array, FPGA. Processor 410 may comprise an Intel Xeon processor for example. Processor 410 may be means for performing method steps in device 400, such as determining, causing transmitting and causing receiving. Processor 410 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular standard, such as a standard defined by the 3GPP. Transmitter 430 may comprise more than one transmitter. Receiver 440 may comprise more than one receiver. Transmitter 430 and/or receiver 440 may be configured to operate in accordance with a suitable communication standard.

Device 400 may comprise User Interface, UI, 450. UI 450 may comprise at least one of a display, a keyboard, a touchscreen, a vibrator arranged to signal to a user by causing device 400 to vibrate, a speaker and a microphone. A user may be able to operate device 400 via UI 450, for example to configure device 400 and/or functions it runs.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. In some example embodiments, device 400 lacks at least one device described above. For example, device 400 may not have UI 450.

Processor 410, memory 420, transmitter 430, receiver 440 and/or UI 450 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the embodiment various ways of interconnecting at least two of the aforementioned devices may be selected without departing from the scope of the present invention.

Figure 5:
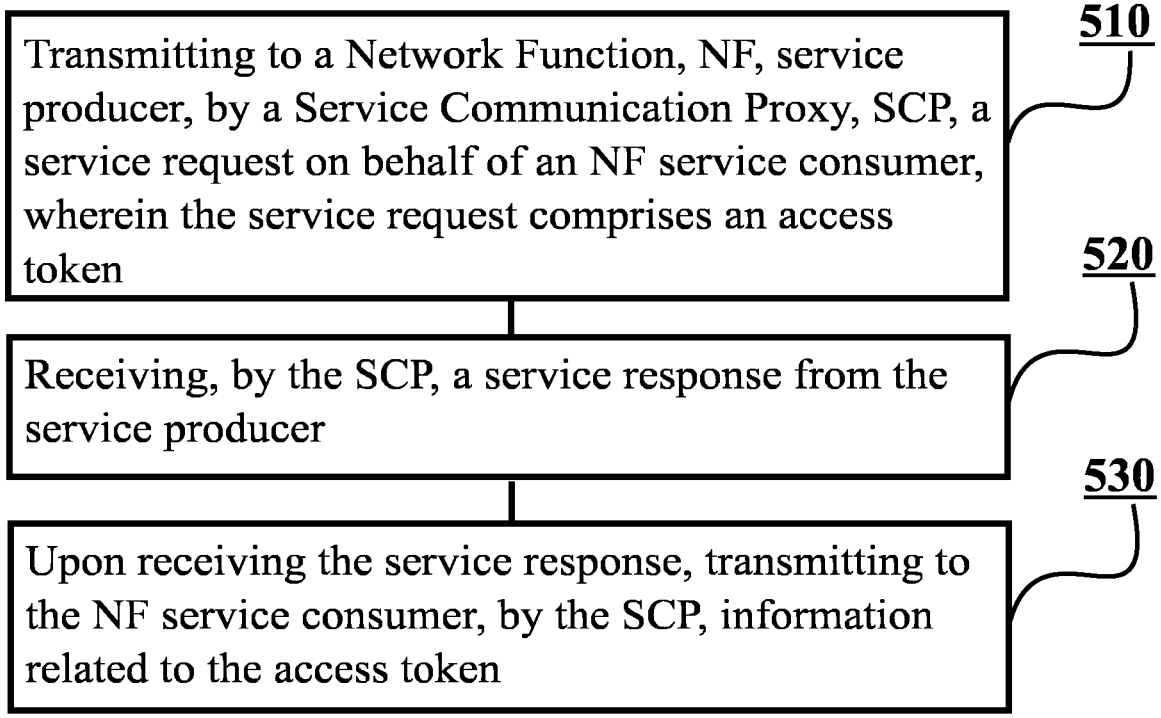
FIG. 5 illustrates a flow graph of a first method in accordance with at least some example embodiments.

FIG. 5 is a flow graph of a first method in accordance with at least some example embodiments. The phases of the illustrated first method may be performed by a SCP, such as SCP 150, or by a control device configured to control the functioning thereof, possibly when installed therein.

The first method may comprise, at step 510, transmitting to a Network Function, NF, service producer, by a Service Communication Proxy, SCP, a service request on behalf of an NF service consumer, wherein the service request comprises an access token. The first method may also comprise, at step 520, receiving, by the SCP, a service response from the NF service producer. Finally, the first method may comprise, at step 530, upon receiving the service response, transmitting to the NF service consumer, by the SCP, information related to the access token.

Figure 6:
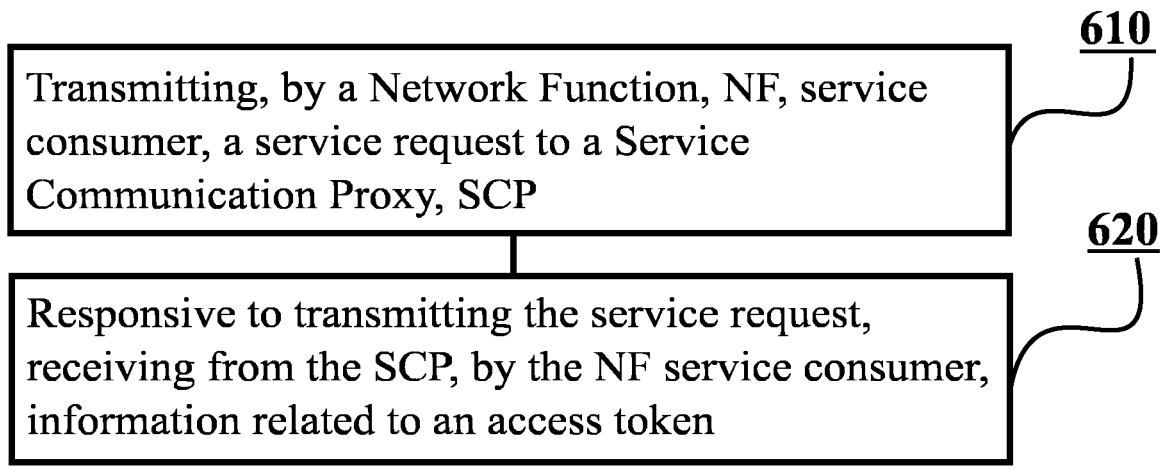
FIG. 6 illustrates a flow graph of a second method in accordance with at least some example embodiments.

FIG. 6 is a flow graph of a second method in accordance with at least some example embodiments. The phases of the illustrated second method may be performed by an NF service consumer, such as a NFc 120, or by a control device configured to control the functioning thereof, possibly when installed therein.

The second method may comprise, at step 610, transmitting, by a Network Function, NF, service consumer, a service request to a Service Communication Proxy, SCP. The second method may also comprise, at step 620, receiving from the SCP, by the NF service consumer, information related to an access token responsive to transmitting the service request.

In some embodiments, the SCP may receive in a (subsequent) request the new header, and for example request an access token to the (Access) Authorization Server using the information received in the new header, and receive an access token from the authorization server that it includes in the request it forwards to the NF service producer.

In some embodiments, the NFc may receive the access token info from the SCP in a service response, and include access token info in subsequent requests using said access token info. For example, the NFc may include the same access token info in subsequent request, as received from SCP or include the requested access token info (using for example discovery headers), according to the access token info received from the SCP.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, SCP 150 or NFp 120, or a device controlling functioning thereof, may comprise means for carrying out the example embodiments described above and any combination thereof.

In an example embodiment, a computer program may be configured to cause a method in accordance with the example embodiments described above and any combination thereof. In an exemplary example embodiment, a computer program product, embodied on a non-transitory computer readable medium, may be configured to control a processor to perform a process comprising the example embodiments described above and any combination thereof.

In an example embodiment, an apparatus, such as, for example, SCP 150 or NFp 120, or a device controlling functioning thereof, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application at least in 5G core networks, wherein management of access tokens is important, and possibly in other networks in the future as well.

ACRONYMS LIST

3GPP 3rd Generation Partnership Project
AF Application Function
AMF Access and Mobility Function
API Application Programming Interfaces
AUSF Authentication Server Function
CCA Client Credentials Assertion
DRA Diameter Routing Agent
NEF Network Exposure Function
NF Network Function
NFc NF service consumer
NFp NF service producer
NRF Network Repository Function
NSSF Network Slice Selection Function
NWDAF Network Data Analysis Function
OAM Operations Administration and Maintenance
PCF Policy Control Function
PLMN Public Land Mobile Network
SBA Service-Based Architecture
SBI Service-Based Interface
SCP Service Communication Proxy
SEPP Security Edge Protection Proxy
SMF Session Management Function
TLS Transport Layer Security
UDM Unified Data Management
VNF Virtual Network Function

| REFERENCE SIGNS LIST | |
| --- | --- |
| 110, 112 | PLMNs |
| 120, 122 | NFs |
| 130, 132 | SEPPs |
| 140, 142 | NRFs |
| 150, 152 | SCPs |
| 1-9 | Steps of the process of FIG. 3 |
| 400-450 | Structure of the apparatus of FIG. 4 |
| 510-530 | Phases of the first method in FIG. 5 |
| 610-630 | Phases of the second method in FIG. 6 |

The invention claimed is:

1. An apparatus comprising at least one processor, at least one memory including computer program code, the at least one memory and the computer program code being configured to, with the at least one processor, cause the apparatus to:
   transmit to a Network Function, NF, service producer, by a Service Communication Proxy, SCP, a service request on behalf of an NF service consumer, wherein the service request comprises an access token;
   receive, by the SCP, a service response from the NF service producer; and
   transmit to the NF service consumer, by the SCP, information related to the access token upon receiving the service response,
wherein said information related to the access token, preferably generated by the SCP, comprises at least one access token request parameter.

2. An apparatus according to claim 1, wherein said information related to the at least one access token request parameter comprises a parameter used by the SCP to retrieve the access token.

3. An apparatus according to claim 1, wherein said information related to the access token indicates what information the NF service consumer should include to subsequent requests for access authorization, and said information related to the access token is preferably in a header, such as a 3GPP-SBI-AccessTokenRelatedInfo header or an HTTP header.

4. An apparatus according to claim 1, wherein the access token is transmitted along with said information related to the access token.

5. An apparatus according to claim 1, wherein the memory and computer program code are further configured to, with the processor, cause the apparatus to:
   forward by the SCP a header comprising said information related to the access token, such as a 3GPP-SBI-AccessTokenRelatedInfo header or an HTTP header, received from a SCP producer to the NF service consumer, wherein the SCP is a SCP consumer.

6. An apparatus according to claim 1, wherein the memory and computer program code are further configured to, with the processor, cause the apparatus to:
   transmit by the SCP a header comprising said information related to the access token, such as a 3GPP-SBI-AccessTokenRelatedInfo header or an HTTP header, to a SCP producer, wherein the SCP is a SCP consumer.

7. An apparatus comprising at least one processor, at least one memory including computer program code, the at least one memory and the computer program code being configured to, with the at least one processor, cause the apparatus to:
   transmit, by a Network Function, NF, service consumer, a service request to a Service Communication Proxy, SCP; and
   receive from the SCP, by the NF service consumer, information related to an access token responsive to transmitting the service request, wherein said information related to the access token comprises at least one access token request parameter.

8. An apparatus according to claim 7, wherein said information related to the at least one access token request parameter comprises a parameter used by the SCP to retrieve the access token.

9. An apparatus according to claim 7, wherein said information related to the access token indicates what information the NF service consumer should include to subsequent requests for access authorization.

10. An apparatus according to claim 7, wherein the access token is received along with said information related to the access token.

11. An apparatus according to claim 7, wherein the memory and computer program code are further configured to, with the processor, cause the apparatus to:
   receive by the NF service consumer a header comprising said information related to the access token, such as a 3GPP-SBI-AccessTokenRelatedInfo header or an HTTP header, received from a SCP producer via the SCP, wherein the SCP is a SCP consumer.

12. A method, comprising:
   transmitting to a Network Function, NF, service producer, by a Service Communication Proxy, SCP, a service request on behalf of an NF service consumer, wherein the service request comprises an access token;

receiving, by the SCP, a service response from the NF service producer; and upon receiving the service response, transmitting to the NF service consumer, by the SCP, information related to the access token, wherein said information related to the access token, preferably generated by the SCP, comprises at least one access token request parameter.

13. A method according to claim 12, wherein said information related to the at least one access token request parameter comprises a parameter used by the SCP to retrieve the access token.

14. A method according to claim 12, wherein said information related to the access token indicates what information the NF service consumer should include to subsequent requests for access authorization, and said information related to the access token is preferably in a header, such as a 3GPP-SBI-AccessTokenRelatedInfo header or an HTTP header.

15. A method according to claim 12, wherein the access token is transmitted along with said information related to the access token.

16. A method according to claim 12, further comprising:

forwarding by the SCP a header comprising said information related to the access token, such as a 3GPP-SBI-AccessTokenRelatedInfo header or an HTTP header, received from a SCP producer to the NF service consumer, wherein the SCP is a SCP consumer.

17. A method according to claim 12, further comprising:

transmitting by the SCP a header comprising said information related to the access token, such as a 3GPP-SBI-AccessTokenRelatedInfo header or an HTTP header, to a SCP producer, wherein the SCP is a SCP consumer.

* * * * *